United States Patent [19]

Taylor

[11] 4,149,926
[45] Apr. 17, 1979

[54] METHOD AND APPARATUS FOR BONDING TREADS TO TIRES

[75] Inventor: Don A. Taylor, Wadsworth, Ohio

[73] Assignee: Victor E. Buehrle, Akron, Ohio

[21] Appl. No.: 783,936

[22] Filed: Apr. 1, 1977

Related U.S. Application Data

[63] Continuation-in-part of Ser. No. 680,362, Apr. 26, 1976, abandoned.

[51] Int. Cl.² ............... B29H 17/36; B29H 17/02
[52] U.S. Cl. ............................... 156/405 R; 156/96; 156/286; 156/322; 156/405; 219/243; 432/225; 432/228; 432/231
[58] Field of Search ............... 156/87, 96, 111, 128 R, 156/129, 130, 156, 231, 238, 272, 285, 286, 302, 320, 321, 322, 323, 324, 396, 405, 408, 394, 421; 425/14, 17, 22, 31, 38, 121, 126 R; 264/36, 313, 315, 316, 326, 345; 432/8, 59, 60, 225, 228, 231; 219/243, 244; 74/231, 237, 239, 240

[56] References Cited

U.S. PATENT DOCUMENTS

| 3,236,709 | 2/1966 | Carver | 156/96 |
|---|---|---|---|
| 3,236,712 | 2/1966 | Mason | 156/231 |
| 3,316,137 | 4/1967 | Wisotzky | 156/322 |
| 3,364,091 | 1/1968 | Conti | 156/320 |
| 3,397,100 | 8/1968 | Christie | 156/97 |
| 3,442,746 | 5/1969 | Robertson | 156/396 |
| 3,728,181 | 4/1973 | Simmons | 156/130 |
| 3,865,670 | 2/1975 | Habert | 156/396 |
| 3,883,382 | 5/1975 | Pelletier | 156/96 |
| 3,904,459 | 9/1975 | Schelkmann | 156/96 |

FOREIGN PATENT DOCUMENTS

| 1802085 | 10/1968 | Fed. Rep. of Germany | 156/96 |
|---|---|---|---|
| 2353747 | 4/1975 | Fed. Rep. of Germany | 156/96 |
| 555680 | 9/1943 | United Kingdom | 156/96 |

Primary Examiner—David Klein
Assistant Examiner—John E. Kittle, Jr.
Attorney, Agent, or Firm—Reese Taylor

[57] ABSTRACT

Disclosed herein is an apparatus for assembling and bonding a pre-cured tread strip to the carcass of a new tire or the casing of a tire to be retreaded wherein the tread is preheated and that heat is utilized to assist in the final bonding of the tread to the carcass. A heated drum is utilized, with the tread being wrapped around the periphery thereof and brought to an elevated temperature following which a roller type transfer mechanism is used to transfer the tread to a tire support and assembly apparatus where a stitcher and locking and sealing ring temporarily secure the tread to the periphery of the carcass with previously applied cushion gum material sandwiched therebetween. A shifting mechanism is then activated to transfer the tire and the tire support and assembly apparatus to a curing chamber where the tread is engaged by a heated belt which, together with the residual heat in the tread, serves to complete bonding of the tread to the carcass.

22 Claims, 18 Drawing Figures

METHOD AND APPARATUS FOR BONDING TREADS TO TIRES

RELATED APPLICATIONS

This application is a continuation-in-part of applicant's earlier filed application Ser. No. 680,362 filed Apr. 26, 1976 now abandoned.

BACKGROUND OF THE INVENTION

This invention relates in general to the field of retreading used tires or manufacturing new tires and, in particular to utilizing pre-cured tread material, preheating it and using the heat induced into the tread to assist in bonding the tread to the carcass with the assistance of bonding material such as cushion gum stock.

DESCRIPTION OF THE PRIOR ART

The use of pre-cured tread material either in the recapping or new tire manufacturing field is, by now, well known.

Examples may be seen in Pelletier, U.S. Pat. No. 3,883,382 and Schelkmann, U.S. Pat. No. 3,904,459 showing the use of pre-cured tread materials.

Most present systems known to Applicant involve the preparation of quantities of pre-cured tread stock which is then stored until needed for application to a tire casing or carcass. This stock is usually then applied to the casing or carcass at room temperature following which the assembled tire is subjected to conventional bonding systems such as presses, autoclaves or pressure vessels of various types to complete bonding of the tread to the carcass or casing.

The disadvantages of the present approach to utilization of pre-cured treads essentially are two fold. First, the tread and the casing being at room temperature, it is necessary to utilize relatively high temperatures and pressures to cause the required heat to penetrate the tread and achieve a bond between tread and casing. In addition to the energy cost involved, this is also a relatively slow process.

Second, the various components such as the tread material, tire casing and assembled tires are usually handled manually or with various mechanical hoists, etc. so that the operation is relatively slow and labor-intensive.

SUMMARY OF THE INVENTION

It is believed that the aforementioned disadvantages can be overcome by providing apparatus for preheating the tread material, transferring it to the tire casing, and then transferring the assembled tire to a curing chamber where a heated belt and the residual heat in the tread may accomplish the bond of the tread to the casing.

Such apparatus permits a relatively rapid, automated operation with reduced costs.

To this end, it is an object of this invention to provide preheating means in the form of a rotatable heated drum and first transfer means for automatically transferring the pre-cured material to the periphery of the drum where its temperature may be elevated as desired.

It is further object of this invention to provide a tire support and assembly apparatus and means for applying a layer of cushion gum to the tire casing or carcass and a second transfer means for automatically transferring the preheated tread material to the tire casing or carcass and securing it to the periphery thereof overlying the cushion gum.

It is further object of this invention to provide a curing chamber which includes a heated belt which can closely engage the tread of the assembled tire and mechanical shifting means for moving the tire support and assembly apparatus from a position adjacent the preheating means to the curing chamber and back.

Accordingly, production of apparatus for bonding tread to tires of the character described becomes the principal object of this invention, with other objects thereof becoming more apparent upon a reading of the following brief specification, considered and interpreted in view of the accompanying drawings.

DESCRIPTION OF THE PREFERRED EMBODIMENTS

The Tread Heating Drum 10, Frame 20, and Drive Means 30

Figure 1:
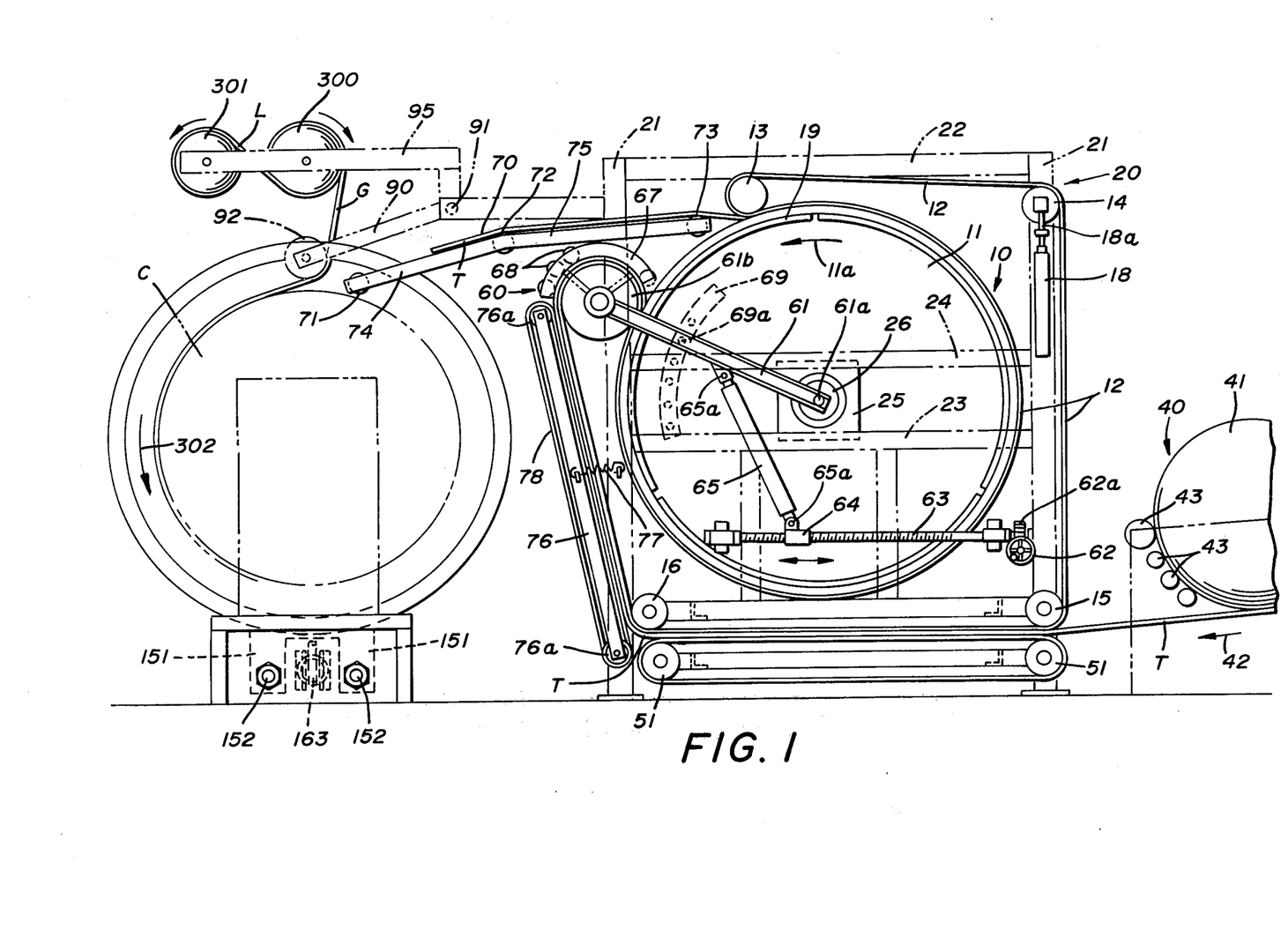
FIG. 1 is a side elevational view showing the tread heating assembly, the gum applying means and part of the tire support and assembly machinery.
Figure 1A:
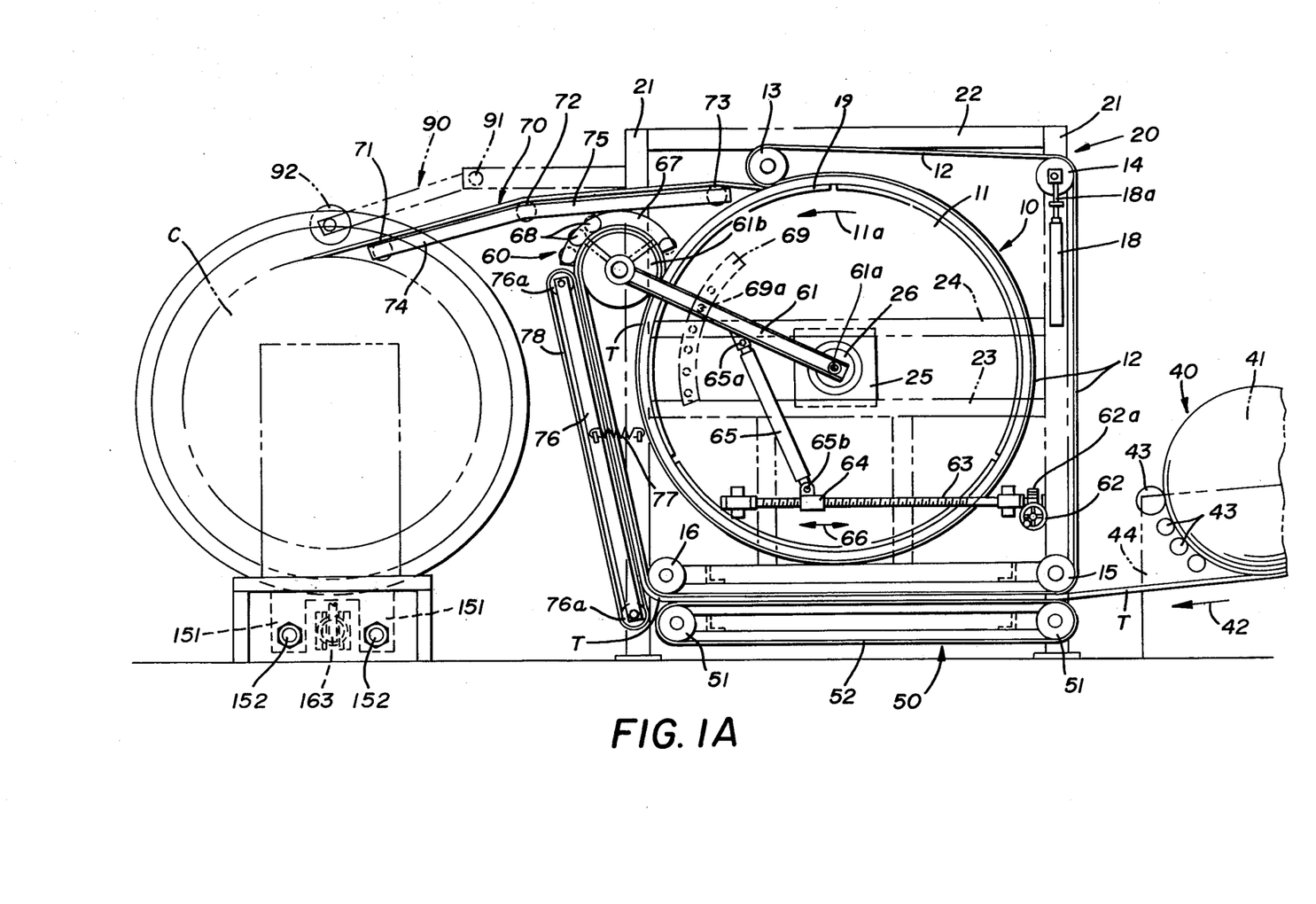
FIG. 1A is a side elevational view similar to FIG. 1 with the gum applying means removed for clarity of illustration and showing the tread heating assembly and part of the tire support and assembly machinery.

Referring first to FIGS. 1 and 1A it will be noted that the invention includes, in general, a tread heating drum 10, frame 20 and drive means 30. Secured to frame 20 is a support 95 which carries a cushion gum supply roll 300 and a liner take up roll 301 to receive liner L. This structure permits the gum G to be applied to the periphery of carcass C and stitched by stitcher 92 prior to application of the tread material T as will be described.

This cushion gum application has been shown almost schematically since there are several known mechanisms for this purpose. The significant point with regard to this application is that the cushion gum G be applied before the tread T.

It should also be noted that this mechanism is only illustrated in FIG. 1 of the drawings for ease of illustration.

Figures 2, 5:
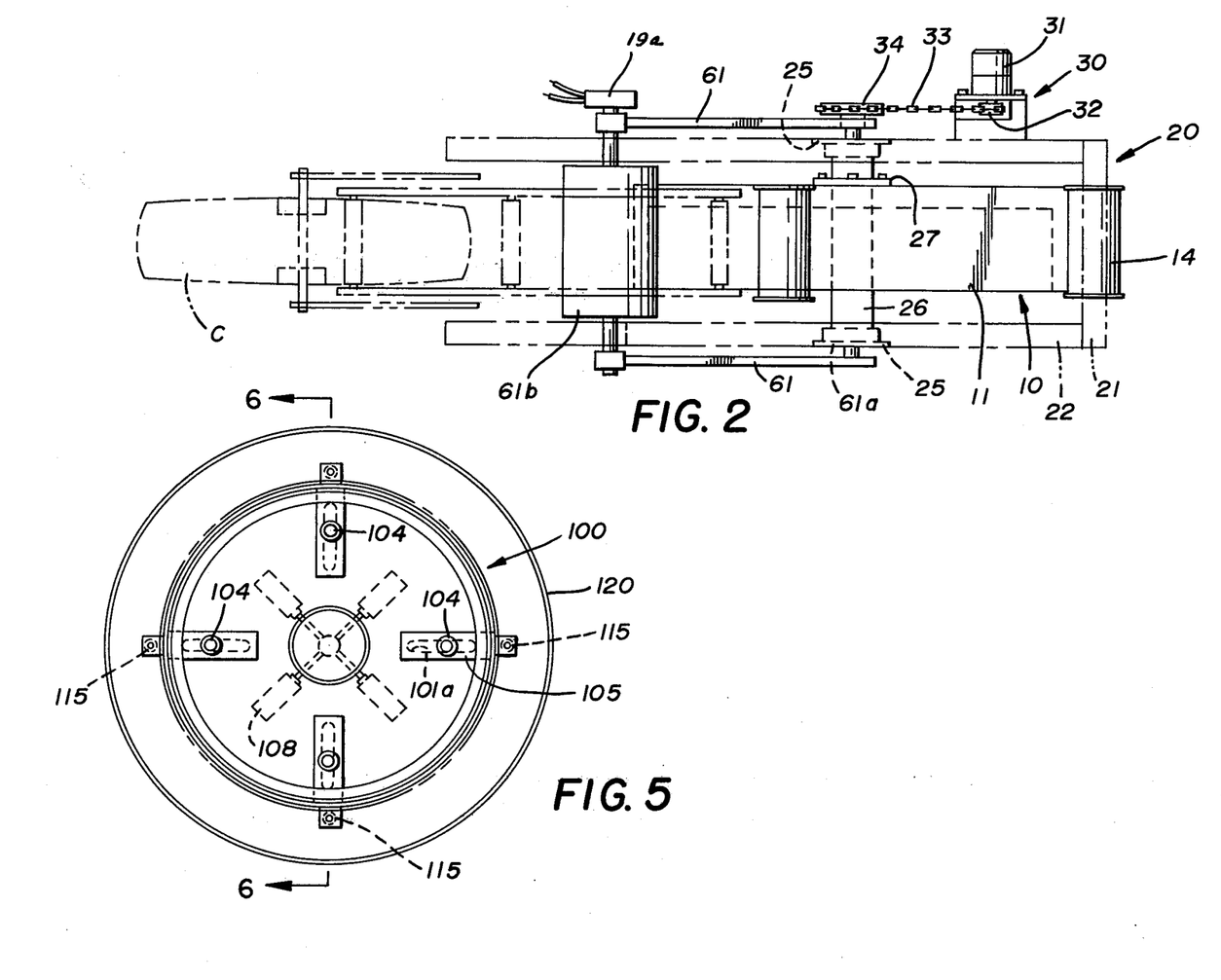
FIG. 2 is a top plan view of the structure shown in FIG. 1.
FIG. 5 is an elevational view of the locking and sealing ring assembly.

Referring next to FIGS. 1, 1A and 2 of the drawings, the tread heating drum assembly, generally indicated by the numeral 10, includes a heated drum 11 and an endless belt 12, with the belt being threaded around a plurality of rollers 13, 14, 15, 16, and as well as roll 61b, all of which are mounted on a frame assembly 20. A series of heating elements 19 are also shown on the inner surface of drum 11, and heat is induced into them by collector ring 19a. These are illustrated schematically, since there are a number of alternative ways in which the drum may be heated.

The frame assembly 20 forms a cubical support skeleton for various elements and includes a plurality of vertical frame members 21, 21, top horizontal frame member 22, 22, and intermediate frame members 23, 24 interconnected in suitable fashion such as by welding, for example.

Mounted on one of the vertical frame members 21 is an air cylinder 18, with a cylinder rod 18a attached to the roller 14 so that this roller may serve as a take-up or tension roll, as well as one of the carrying means for the belt 12.

The intermediate frame members 23 and 24 carry opposed bearing blocks 25, 25 which have a shaft 26 journaled therebetween. A locking plate 27 is mounted on the shaft 26 and is secured to one side of the drum 11 so that it will move therewith.

A drive assembly 30 (see FIG. 2) is also provided on the frame assembly 20 and includes a motor 31, a sprocket 32 attached to motor 31, and a sprocket 34. The sprocket 34, which is carried on one end of the shaft 26, is connected to the sprocket 32 by chain 33 so that upon actuation of the motor 31 the shaft 26 can be driven and the heated drum 11 will be rotated in the direction of the arrow 11a.

It will be noted from FIG. 1 of the drawings that the endless belt 12 closely encircles substantially all of the periphery of the heated drum 11, and air cylinder 18 and take-up roll 18a, as well as arm 61, ensure that the belt 12 is kept in this relationship, under tension, for purposes which will now be more fully described.

The Tread Supply and Transfer Means 40, 50 and 70

Disposed adjacent the frame assembly 20 and heated drum 11 is a tread supply apparatus 40 which provides the pre-cured tread material for use in operation of the overall device.

In this regard, a frame 44 is provided, with a plurality of rolls 43, 43 disposed therein in a semi-circular condition in a manner well known in the art. This structure is only schematically illustrated, since its details are believed to be well within the knowledge of one skilled in this art. Thus, the roll 41 of pre-cured tread material T is simply dropped into the saddle formed by rolls 43, 43, and the tread material T is wound off of the roll in the direction of the arrow 42 into the bite formed between rolls 15 and 51 and the belts 12 and 52, as clearly shown in FIG. 1 of the drawings.

In this regard, the rolls 51, 51 and belt 52 form part of a belt conveyor assembly, generally indicated by the numeral 50, and this assembly includes the opposed rolls 51, 51 carried by frame 20, and a belt 52 passed about the rolls so as to provide a support for the tread material T as it passes along this conveyor belt assembly 50. It should be noted that when motor 31 is actuated to drive drum 11 as has been described, the belt 12, being in contact with the periphery thereof will also be driven. Tread material T, being sandwiched between driven belt 12 and belt 52, and in frictional contact therewith, will cause belt 52 to move around rolls 51, 51. In this fashion, the tread material T is then stripped from roll 41 in the direction of arrow 42.

Also pivotally secured to frame 20 is an arm 76 which is also connected, intermediate its ends, to the frame by spring 77. This arm carries rolls 76a, 76a on its ends and has an endless belt 78 passed around the rolls. Belt 78 thus cooperates with endless belt 12 in the same fashion as belt 52 to provide support for tread material T.

The pivotal interconnection of arm 76 and frame 20, together with spring 77 causes the arm to be normally drawn toward frame 20, but permits movement thereof in response to adjustment of arm 61, as will be more fully described.

The Hold Down and Control Assembly 60 and Roller Assembly 70

Also mounted on frame assembly 20 is a hold down and control assembly 60. This includes a pair of elongate arms 61, 61, pivoted to the bearing blocks 25, 25, as at 61a. Only one of these arms will be described in detail, with it being understood that the arms are mounted in parallel relationship, one on each side of heated drum 11. This arm 61 provides or includes a roll 61b at its outboard end, and also a support mechanism 67, which is in the form of an arcuate frame, carrying a plurality of rollers 68, 68 thereon.

Secured to the arm 61 intermediate its ends is an adjustment arm 65 which is pivotally secured thereto, as at 65a. The opposed end of this arm 65b is pivoted to a threaded coupling 64 which is received on the threaded arm 63, with this mechanism being mounted on the frame assembly 20. A hand crank 62 is connected to a gear 62a, so that upon turning of the hand crank 62, gear 62a will cause the threaded shaft 63 to rotate causing the threaded coupling 64 to move along the longitudinal axis of the shaft 63. This in turn makes it possible to adjust the position of the arm 61 to accommodate the varying sizes of tires by controlling the amount of tread material which is wrapped around the drum.

It should be noted that only one hand crank is contemplated, with a shaft passing across frame 20 so that when hand crank 62 is turned, the position of the arms on both sides of the heated drum 11 will be similarly affected.

A locking plate 69 is also provided on frame 60 so that the arm 61, once it has been moved angularly, can be locked in position by inserting shot pins 69a in the holes in the arm 61 and the locking plate 69. In the preferred form of the invention two of these plates are intended, with one on each side of the frame, although only one is illustrated in detail.

It should also be noted that as the assembly 60 is adjusted, the arm 76 can also adjust automatically against the force of the spring 77. In this way, belt 78 will at all times be disposed in close adjacency with endless belt 12 in order to support tread material T.

Also carried on the frame assembly 20 and projecting therefrom is a roller assembly 70 which consists of a plurality of rolls 71, 72, 73, interconnected and carried by arms 74, 74 for purposes which will be described in greater detail below.

Operation of Elements 10, 20, 30, 40, 50, 60 and 70

In operation of these components it will first be assumed that the carcass C has been rotated in the direction of arrow 302 and cushion gum material G will have been applied to the periphery thereof.

Following this and after activating heating elements 19, the motor 31 will be activated to rotate the heated drum 11 and endless belt 12 in the direction of the arrow 11a or in other words, in a counter-clockwise direction. The pre-cured tread material T will be unwound from the roll 41, passed between belts 12 and 52 and 12 and 78 and over roll 61b onto the periphery of the drum. The belt 12 which closely encircles the periphery of the heated drum will retain the tread material on the drum until the desired length of tread material T has been affixed to the circumference of the drum.

The drum, which is heated in any desirable fashion, will, by surface contact, heat the tread material T to the desired temperature, such as for example 250° to 300° F., or higher if desired. Once this has been accomplished, the drum is again rotated so that the tread material is stripped off the drum 11 over the roller assembly 70 and thence onto the tire carcass C, as clearly shown in FIG. 1A of the drawings with cushion gum material G between tread T and carcass C. The normal tackiness of the tread material T, having been increased by heating, will temporarily cause it to adhere to the exposed surface of the cushion gum G, but the apparatus necessary to actually assemble the carcuss and tread material into a tire will now be described in greater detail.

It should be noted that cutoff of the tread material to conform to the size of carcass C would be accomplished between the point at which the tread material T leaves drum 11 and the point at which it is applied to carcass C. This can be accomplished in a number of ways, including manually; and no structure has been specifically illustrated, since one skilled in this art would be capable of selecting the necessary existing cutoff apparatus.

The Applicator and Assembly Elements 80, 90 and 100

An applicator roll assembly is also provided, and is generally indicated by the numeral 90, with this assembly being comprised of an adjustable support 91 and an applicator or stitching roll 92 on the outboard end of support 91 so that the tread material T can be stitched to the carcass C as the carcass is rotated, as will now be described.

Figure 3:
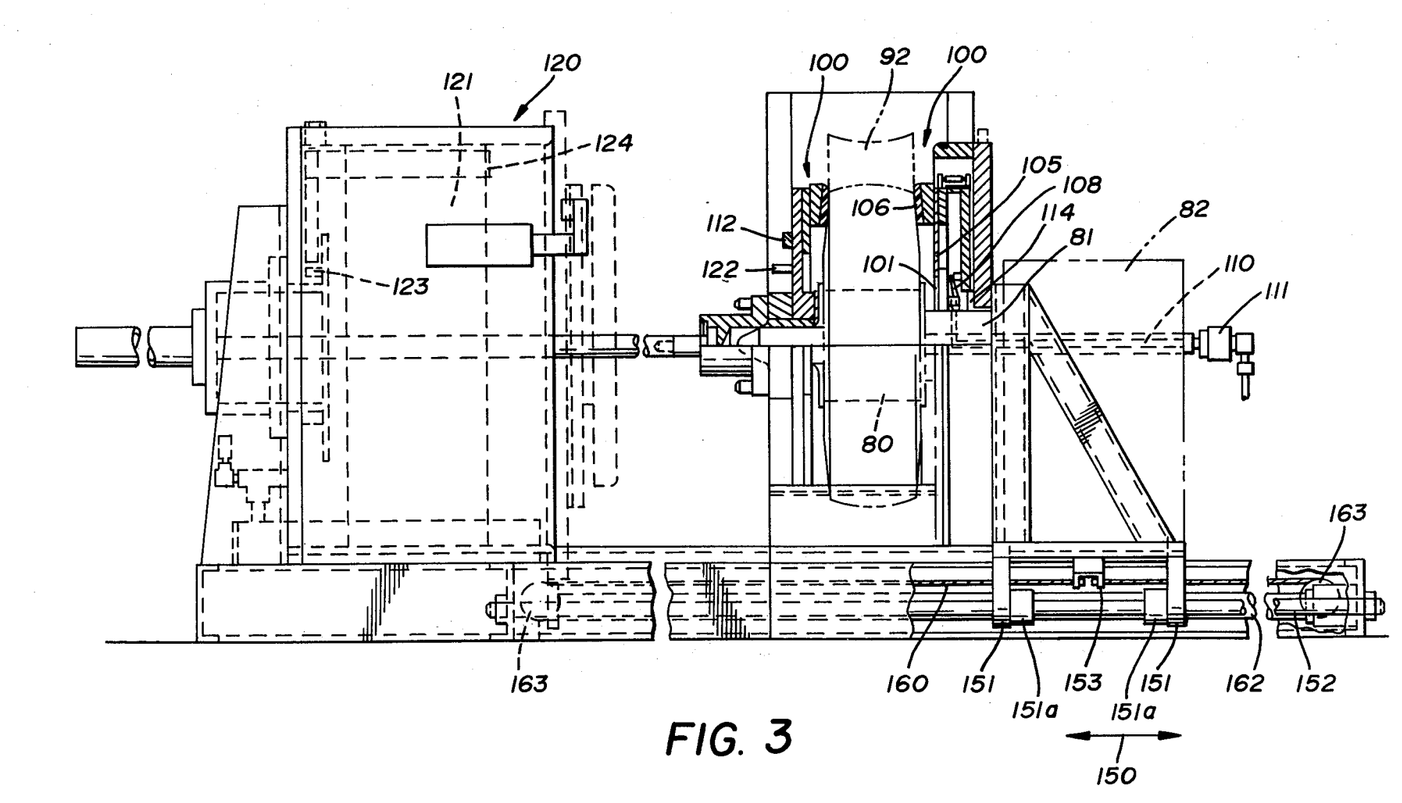
FIG. 3 is an elevational view showing the tire support and assembly machinery and the curing chamber.

The tire assembly and support component referring to FIG. 3 of the drawings for example, includes an expandable chuck 80 which can engage the inner surface of the tire carcass C, with this chuck 80 being secured to a rotatable shaft 81 which is, in turn, connected to a power unit 82 which will cause the shaft to rotate upon actuation thereof.

A locking and sealing ring assembly is also provided (see FIGS. 3, 5, and 6) on each side of the carcass C, with each of these assemblies 100 including a carrier plate 101 having a slot 101a provided therein for accommodating various tire sizes.

A tire engagement ring 102 is provided for engagement with the tire carcass C and tread material T. A nut 102 and bolt 104 are also provided so that the ring 102 and the closure strap 105 which closes off the slot 101a can be fixed to the ring 102. In this way, rings of various sizes can be utilized to accommodate various size tires.

The ring 102 also carries an elastomeric pad 106 thereon, with the pad having air bleed holes 106a therein, with the ring being secured to the closure plate by the screws 102, 107.

A heating element 102a is also provided on the ring 102 to assist in bonding the periphery of the tread T to the casing C, and is shown in schematic fashion only, since the mechanics of inducing heat at this point would be known to one skilled in this art.

Figure 6:
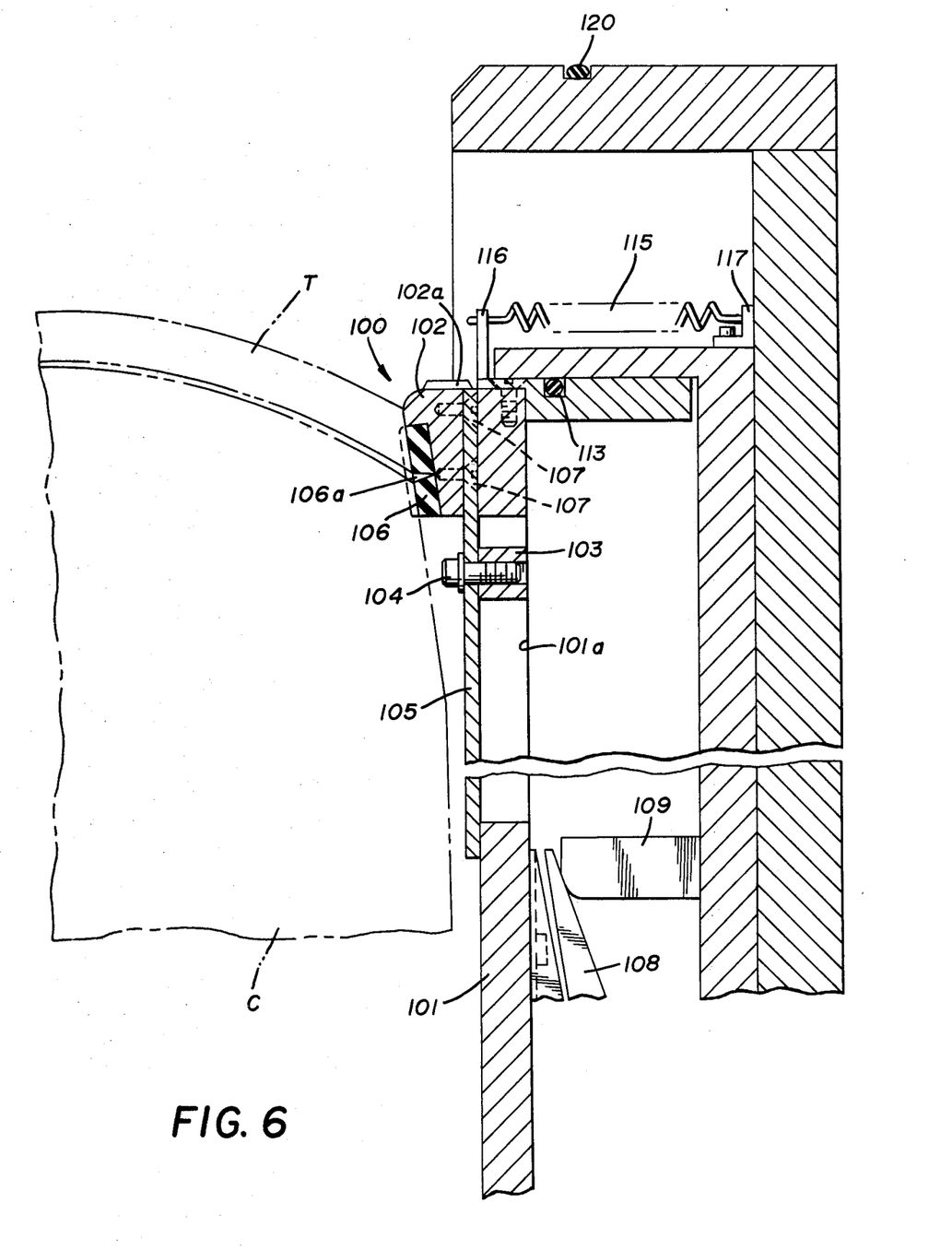
FIG. 6 is a sectional view taken along the lines 6—6 of FIG. 5.
Figure 7:
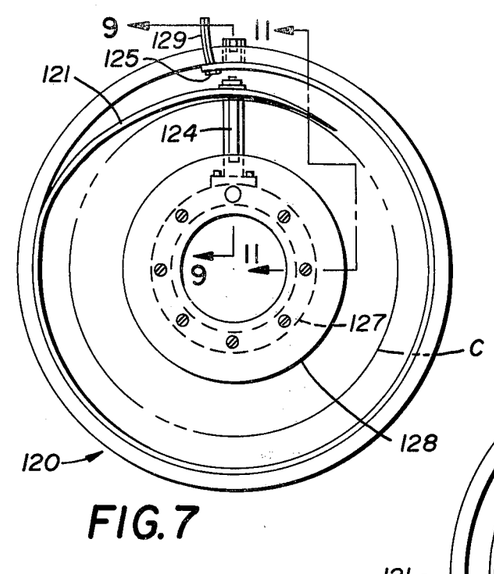
FIG. 7 is an elevational view of the heated belt assembly of the curing chamber.
Figure 8:
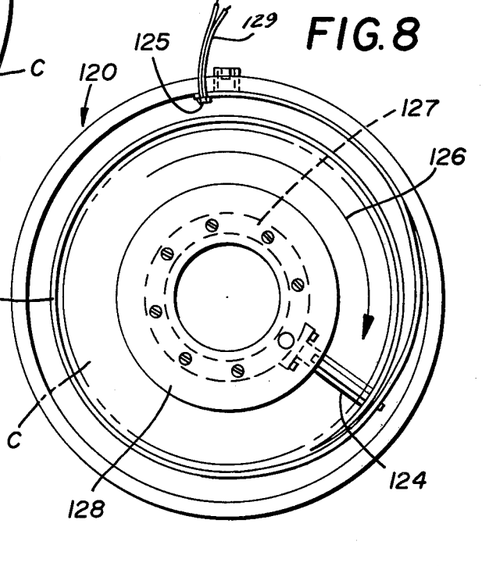
FIG. 8 is a view similar to FIG. 7, with the belt assembly in rotated position.

Wedge cylinders 108, 108 are also provided for moving the assembly 100 into and out of contact with the carcass C and tread material T. The cylinders, as shown in FIG. 6, work against a fixed stop member 109. A supply line 110 is secured to a source of hydraulic or air pressure 111 to operate the wedge cylinders 108 so that upon activation thereof, the wedge cylinders will move from the full to broken line positions and, working against stop member 109, will force locking and sealing ring assembly 100 into contact with the tire.

Seal members 112, 113, and 114 on the locking and sealing assembly are also provided to ensure that the assembly 100 provides an airtight seal with the tire when the plate is moved into position, as just described.

A spring 115 is also provided and mounted between brackets 116 and 117 so that when the hydraulic or air pressure is cut out at the source 111 to release wedge cylinders 108, the overall assembly 100 will normally retract away from the tire.

It should also be noted that the entire assembly 100-117 is rotatable with the tire relatively of housing 120 by means of power unit 82.

Operation of Applicator Assembly Elements 80, 90, 100

Once the tread material T has been heated to the desired temperature on heated drum 11, as already described, it is stripped from the drum over roller assembly 70.

At this time, the locking and sealing ring assemblies 100, 100 (see FIGS. 3 and 6) will have been moved into contact with carcass C by wedge cylinders 108, 108 and stitching roll 92 will be disposed to engage the tread material as it comes off roller assembly 70 and onto the periphery of carcass C. Power unit 82, being activated, rotates chuck 80 and carcass C so that tread material T is applied completely about the periphery of the carcass and secured thereto pending final curing. In this regard, stitching roll 90 will actually force the flexible tread material into place between carcass C and pads 106, 106 (see FIG. 6) where the sealing and locking ring assemblies 100, 100 will hold it in place as it is moved into curing chamber 120 by the shifting means.

The Shifting Mechanism

Once the tread material T has been applied to the periphery of carcass C and fixed in place by locking and sealing ring assemblies 100, 100, the assembled tire is ready for curing.

Figure 4:
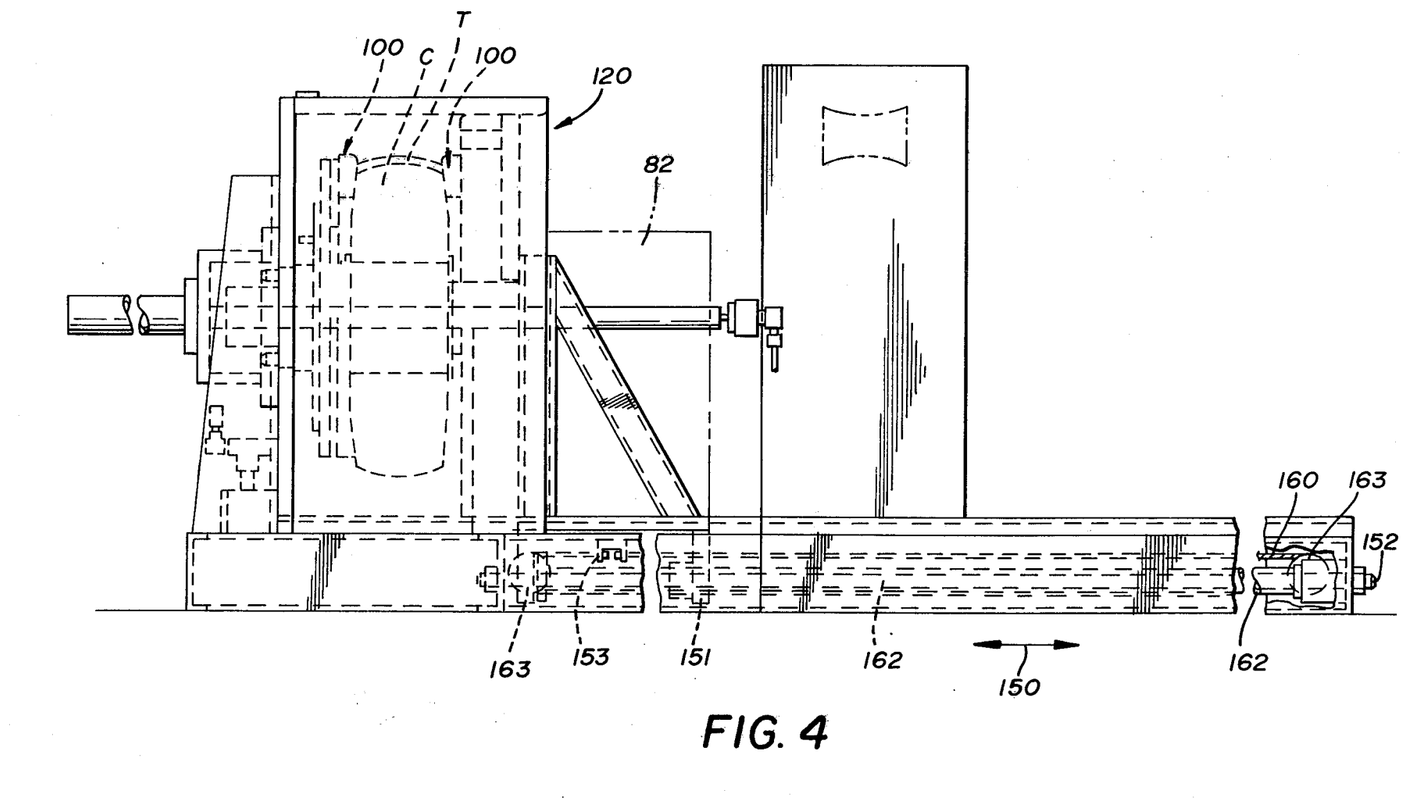
FIG. 4 is an elevational view similar to FIG. 3 showing the tire support and assembly machinery shifted into the tire curing chamber.

To this end, the lower frame work of the tire support and assembly means includes support members 151, 151 which have ball bushings 151a, 151a thereon. These members form track engagement means and move along pipes 152, 152 which form the actual track. Cables 160, 160 are provided and threaded around pulleys 163, 163, each having one end fixed to a bracket 153 on the bottom of the frame. A double acting cylinder 162 is provided and contains a piston 161 to opposite ends of which are attached the remaining ends of cables 160, 160. The cylinder 162 is also provided, with air or hydraulic supply lines 164, 164, so that the piston 161 may be moved in either direction. Thus, upon activation of the same, the cable 160 moves about the pulleys 163, 163, and will move the assembly apparatus in the direction of the arrow 150. In other words, the tire support and assembly element is moved from the position of FIG. 3 to the position of FIG. 4, or from adjacency with the tread heating drum assembly 10 to the curing chamber 120.

The Curing Chamber 120

Referring to FIGS. 3 and 7 through 11 for a description of curing chamber 120, it will be noted that interiorly of the curing chamber 120 is a flexible heated belt 102, one end of which is secured to the interior of the housing by the bracket 125. The opposed end is secured to a rotatable arm 124.

The rotatable arm 124 is carried by a bearing plate 127 which is mounted on a pressure plate 128 and is rotatable therewith. When the device is rotated from the position of FIG. 7 to the position of FIG. 8, the belt will be drawn into close contact with the outer surface of the tread material T.

In this regard, it is intended that the belt will be heated to assist in bonding and curing the tread material T to the casing C. This heating can be accomplished in various ways, such as electrically by wires 129 (see FIGS. 7 and 8).

Figures 9, 10:
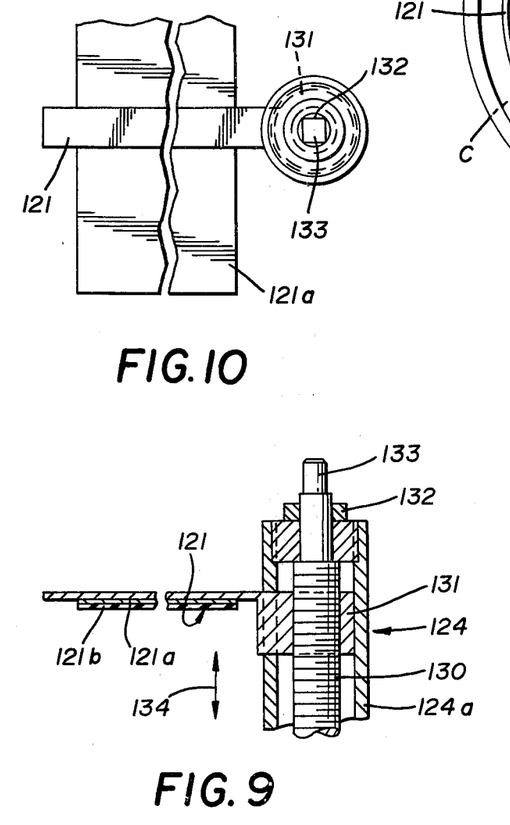
FIG. 9 is a sectional view taken along the line 9—9 of FIG. 7.
FIG. 10 is a top plan view of the apparatus of FIG. 9.

One variation of the belt 121 shown in FIG. 9 includes a stainless steel member 121, an electrically heated silicone belt 121a, and a flexible elastomeric belt 121b laminated together to provide the necessary heating properties and as well as the necessary rigidity and firmness to effectively maintain contact with the tread material at all times.

Figure 11:
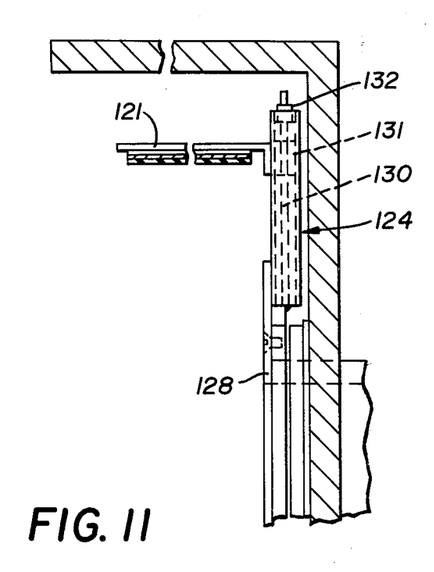
FIG. 11 is a sectional view taken along the line 11—11 of FIG. 7.

This belt structure is also adjustable, as will be seen from FIGS. 9 through 11. Thus, the arm 124 includes a housing with a threaded shaft 130 telescopically received therein. A non-rotatable nut 131 is received on shaft 130 and to projecting end 133, which is passed through collar 132, has a configuration adapted to be engaged by a wrench. In this way, turning shaft 130 will cause nut 131 to move in the direction of the arrow 134, as desired, so as to accommodate various sizes of tires.

As noted above, the assembly and chucking apparatus are movable along a line of travel in the direction of the arrow 150 so that once the assembled tire has been moved into curing chamber 120 the pressure plate 128 can be rotated so that belt 121 closely engages the periphery of the tire.

In this way, the combination of the heat in tread material T which has been preheated by drum 11 and the heat from belt 121 will, in cooperation with cushion gum material G, accomplish final bonding of the tread material to the carcass.

Once the necessary cure has taken place, the cylinder 162 can be activated and the completed tire removed from the curing chamber 120. Wedge cylinders 108, 108 are then released and springs 115, 115 retract locking and sealing ring assemblies 100, 100, following which chuck 80 can be collapsed and the tire removed.

Modification

Figure 12:
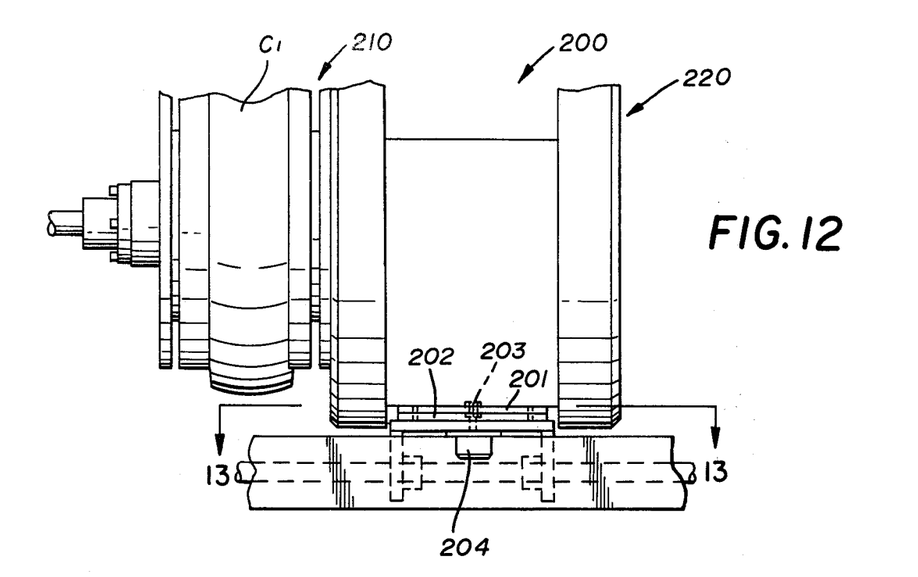
FIG. 12 is an elevational view of a modified form of the tire assembly apparatus.
Figure 13:
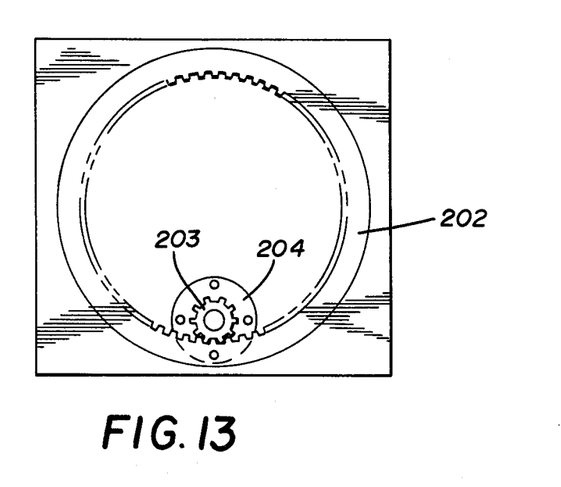
FIG. 13 is a sectional view taken along the line 13—13 of FIG. 12.
Figures 14, 15, 16:
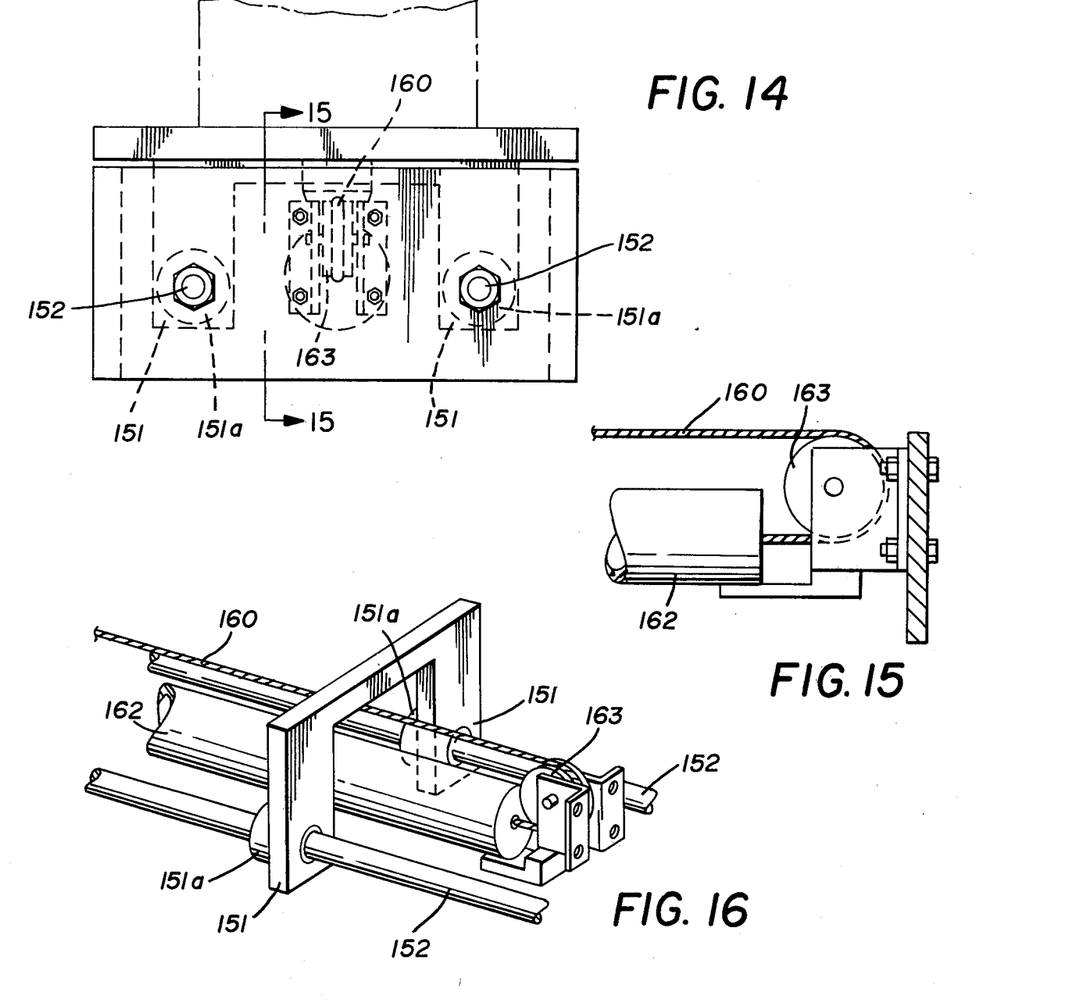
FIG. 14 is a partial end elevational view taken from the right of FIG. 3.
FIG. 15 is a sectional view taken along the line 15—15 of FIG. 14.
FIG. 16 is a perspective view of a portion of the shifting mechanism.
Figure 17:
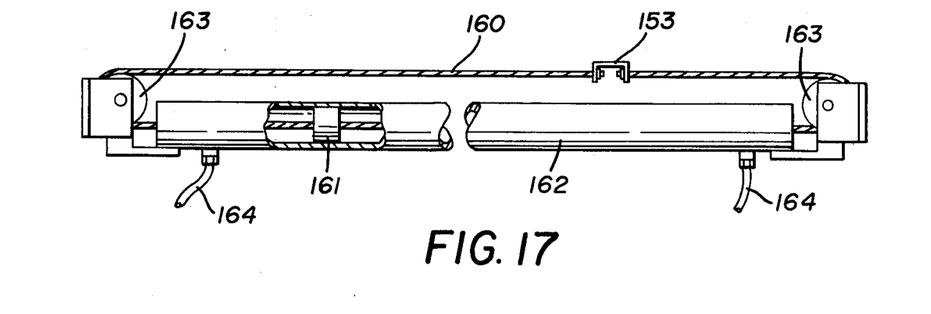
FIG. 17 is an elevational view, partially broken away, showing additional components of the shifting mechanism.

A modified form of the invention is also illustrated in FIGS. 12 and 13, wherein a modified tire support and assembly unit 200 is utilized having opposed tire chucking assemblies 210, 220. In this fashion, the modified builder 200 is mounted on a bearing plate 201 which carries a ring gear 202, a pinion gear 203, and a driving motor 204.

The remaining components of the overall invention remain the same, but in this way, the assembly 200 can be rotated 180° so that at all times once chucking assembly with one tire thereon can be in position within the curing chamber while another one is in position adjacent the heated drum assembly of a second carcass.

While a full and complete description has been set forth in accordance with the patent statutes, it should be understood that modifications may be resorted to without departing from the spirit hereof or the scope of the appended claims.

Thus, where pneumatic or hydraulic actuating means have been referred to, it should be understood that either may be employed.

Furthermore, it will be understood that the apparatus of the invention has equal utility in retreading used tires or building new tires.

It will also be noted that no specific means for heating the drum 11, ring 102, or belt 121 has been disclosed, with it being felt to be within the skill of one knowledged in the art to induce heat into these components by various known means. Accordingly, the heat inducing components have been illustrated, for the most part, schematically.

Finally, no specific cushion gum material G has been specified since any commonly known and commercially available stock may be employed.

What is claimed is:

1. Apparatus for applying a pre-cured tread to a tire casing having a layer of cushion gum material on its periphery, comprising:
   (A) a source of pre-cured tread material;
   (B) heating means;
   (C) first transfer means for moving a predetermined length of tread material from said source to said heating means;
   (D) tire support and assembly means;
   (E) second transfer means for moving said tread material from said heating means to the periphery of a tire carried by said tire support and assembly means;
   (F) curing apparatus; and
   (G) shifting means for moving the assembled tire and tread material and said tire support and assembly means into and out of said curing apparatus.

2. The apparatus of claim 1 wherein said heating means includes:
   (A) a frame; and
   (B) a heated rotatable drum mounted on said frame.

3. The apparatus of claim 2 wherein said first transfer means includes:
   (A) an endless belt carried by said frame and closely encircling the periphery of said heated drum; and
   (B) at least one movable belt system carried by said frame and coacting with at least a portion of said endless belt for supporting said tread material.

4. The apparatus of claim 3 wherein tension adjustment means are carried by said frame adjacent said heated drum and in contact with said endless belt.

5. The apparatus of claim 1 wherein said tire support and assembly means includes:
   (A) at least one expendable tire supporting chuck; and
   (B) a pair of movable sidewall engaging elements disposed on opposed sides of said chuck for engaging at least a portion of said tread and the sidewall of said tire.

6. The apparatus of claim 5 wherein each of said movable sidewall engaging elements include:
   (A) a mounting plate;
   (B) a tire engaging ring mounted on one face of said mounting plate;
   (C) wedge means bearing on the opposed face for moving said mounting plate toward said tire; and
   (D) spring means attached to said mounting plate and normally urging said mounting plate away from said tire.

7. The apparatus of claim 6 wherein said tire engaging ring is heated.

8. The apparatus of claim 6 wherein said tire engaging ring has vent means thereon.

9. The apparatus of claim 6 wherein said tire engaging rings are releasably secured to one face of said mounting plates.

10. The apparatus of claim 1 wherein said second transfer means includes:
   (A) conveyor means interconnecting said heating means and said tire support and assembly means; and
   (B) stitching means carried by said heating means and overlying said tire support and assembly means.

11. The apparatus of claim 1 wherein said curing apparatus includes:
   (A) a curing chamber; and
   (B) adjustable heated tread engagement means secured to the interior of said curing chamber.

12. The apparatus of claim 11 wherein said heated tread engagement means includes:
   (A) an elongate heated belt having:
      (1) one end fixed to the interior surface of said curing chamber; and
      (2) the opposed end fixed to a movable arm;
   (B) said movable arm being rotatable about the axis of the tire.

13. The apparatus of claim 12 wherein said movable rotating arm is adjustable along its longitudinal axis.

14. The apparatus of claim 1 wherein said tire support and assembly means includes:
   (A) a frame;
   (B) a pair of opposed expandable tire supporting chucks carried by said frame; and
   (C) drive means for rotating said frame about a vertical axis.

15. The apparatus of claim 1 wherein said shifting means include:
   (A) an elongate track;
   (B) track engagement means carried on said tire support and assembly means; and
   (C) driving means attached to said track engagement means for moving said tire support and assembly means along said track.

16. The apparatus of claim 15 wherein said shifting means include:
   (A) a pair of opposed pulleys; and
   (B) said driving means including:
      (1) a two-way cylinder;
      (2) a cable threaded around said pulleys and interconnecting said cylinder and said track engagement means.

17. The apparatus of claim 3 wherein tread length control means are provided on said frame for movement of said endless belt about the periphery of said heated drum.

18. The apparatus of claim 17 wherein said control means include:
   (A) a pair of adjustable support arms,
      (1) pivotally mounted on said frame on opposite sides of said heated drum, and
      (2) being movable about the periphery thereof.

19. The apparatus of claim 3 wherein said movable belt system includes:
   (A) a first movable belt,
      (1) disposed beneath said drum in close adjacency with a portion of said endless belt; and
   (B) a second movable belt,
      (1) disposed substantially normally to said first movable belt in close adjacency with a portion of said endless belt.

20. The apparatus of claim 19 wherein tension means interconnect said frame and said second movable belt and normally urge said second movable belt toward said heating means.

21. Apparatus for applying a pre-cured tread to a tire casing, carrying a layer of cushion gum material on its periphery, comprising:
   (A) a source of pre-cured tread material;
   (B) a rotatable heated drum;
   (C) an endless belt, closely encircling the periphery of said heated drum;
   (D) a belt conveyor system disposed between said source of pre-cured tread material and said heated drum and adjacent at least a portion of said periphery of said heated drum adjacent said endless belt for transferring said tread material from said source to said heated drum between said endless belt and the periphery of said drum;
   (E) tire support and assembly apparatus, including:
      (1) a rotatable, expandable tire engaging chuck;
      (2) an adjustable stitching member overlying said chuck and the tire engaged thereby; and
      (3) locking and sealing plates movable into and out of engagement with the sidewall of said tire;
   (F) roller transfer means disposed between said tire support and assembly apparatus and said drum for transferring said tread material from said heated drum to the periphery of said tire;
   (G) a curing chamber; and
   (H) shifting means attached to said tire support and assembly apparatus for shifting said apparatus into and out of said curing chamber.

22. The apparatus of claim 21 wherein a heated belt is received within said curing chamber for engagement with the periphery of said assembled tire.

* * * * *